L. L. BARBER.
CUTTING-ATTACHMENT FOR SEWING-MACHINES.
No. 7,860 Reissued Aug. 28, 1877.
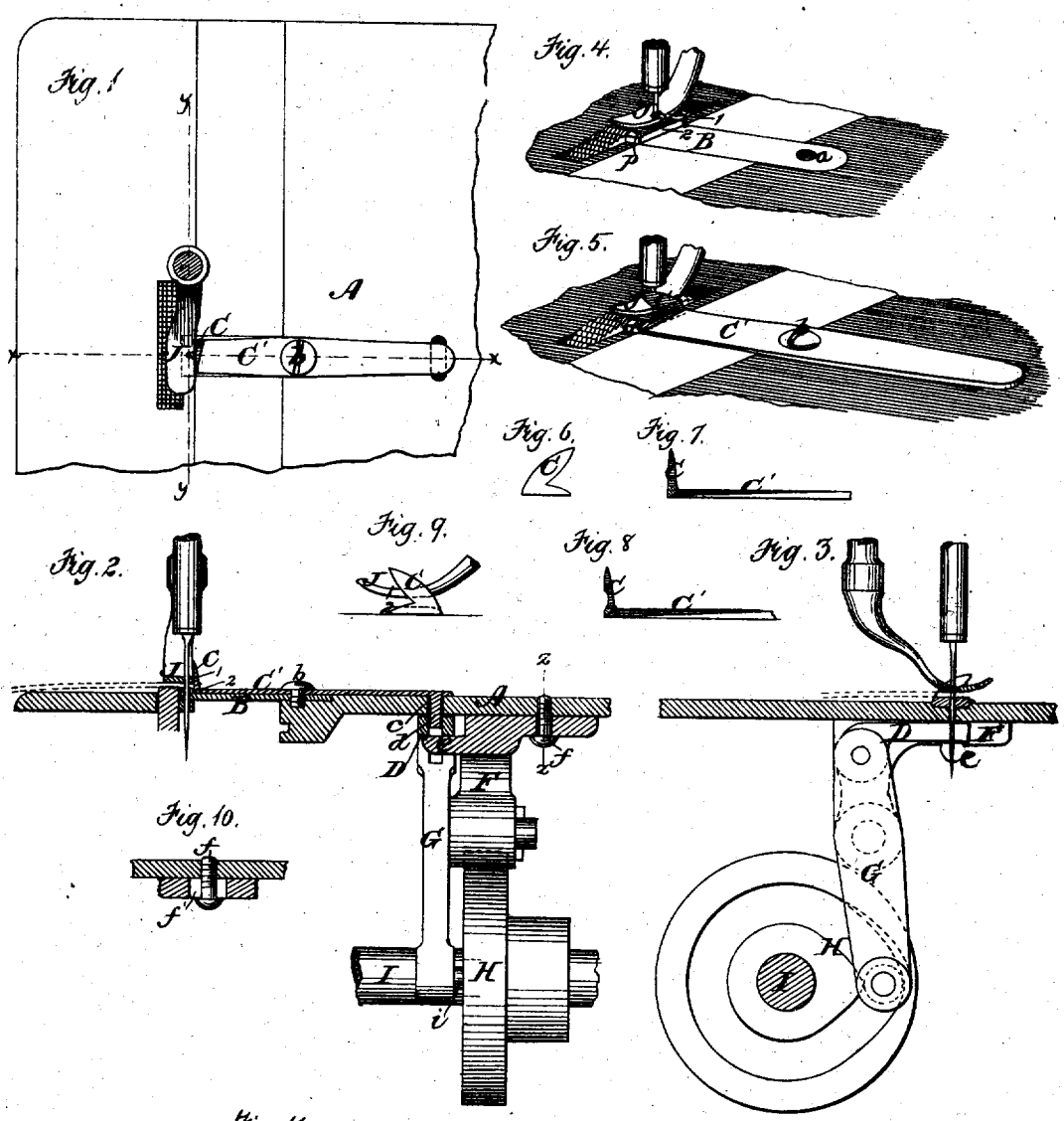
Witnesses.
William J. Thorton
Joseph Lafland
Inventor
Lyman L. Barber
by Fois. Atkys.
Wright Brown

UNITED STATES PATENT OFFICE.

LYMAN L. BARBER, OF BOSTON, MASSACHUSETTS.

IMPROVEMENT IN CUTTING ATTACHMENTS FOR SEWING-MACHINES.

Specification forming part of Letters Patent No. 156,267, dated October 27, 1874; Reissue No. 7,864, dated August 28, 1877; application filed July 17, 1877.

*To all whom it may concern:*

Be it known that I, LYMAN L. BARBER, of Boston, in the county of Suffolk and State of Massachusetts, have invented certain new and useful Improvements in Cutting Attachments for Sewing-Machines, of which the following is a specification:

In the accompanying drawings, forming a part of this specification, Figure 1 represents a plan view of a portion of a sewing-machine with my invention, the presser-bar being shown in section. Fig. 2 represents a vertical section on line *x x*, Fig. 1. Fig. 3 represents a vertical section on line *y y*, Fig. 1. Fig. 4 represents a perspective view of portions of a sewing-machine, the knife being detached from the machine. Fig. 5 represents a perspective view of the same parts with the knife applied to the machine. Figs. 6 and 7 represent, respectively, a side and a front view of the knife-blade. Fig. 8 represents a modification of the form of the knife. Fig. 9 represents a side view of the knife and metal edges 1 2. Fig. 10 is a section on *z z*, Fig. 2. Figs. 11, 12, and 13 represent a modification of the means for operating the knife.

Similar letters of reference in the several figures of the drawing refer to like parts.

This invention relates to that class of cutting attachments for sewing-machines in which the cutter consists of a reciprocating knife operated by the power of the machine, and adapted to trim the edges of leathern or other stock while it is being stitched, and in a line that is parallel with the stitching.

Heretofore in this class of attachments the knife has been reciprocated crosswise or against the side of the stock as the latter is supported on the machine, the knife rising and falling and cutting the stock during the downward movement.

In most cutting attachments the stock is supported from below close beside the point where it is to be cut by a stationary surface that terminates in a wall or shoulder located as close as possible to the point where the knife passes through the stock, said wall or shoulder being generally the side of a slot through which the knife is adapted to pass, the stock being supported on both sides of the slot and knife.

It is essential that the stationary wall or shoulder above mentioned should possess a sharp and well-defined angle, and so be adapted to co-operate with the knife, performing the office of a stationary shear-blade. Said stationary wall or shoulder is liable, however, to be damaged by the downward movement or thrust of the knife, which always presses the stock against the stationary edge and causes attrition, which inevitably wears the supporting-edge away until it becomes rounded, and therefore useless, the stock becoming wedged between the supporting-edge and the knife every time the latter descends, and thus springing or crowding the knife away from said edge, so that the two cannot co-operate in cutting the stock. Moreover, the knife is liable to be sprung or otherwise accidentally moved laterally when it is raised above the supporting-edge, so that when it descends it will strike against said edge, thus damaging both.

My invention has for its object, first, to enable the reciprocating knife to operate in a satisfactory manner without detriment or injury to itself or other parts of the machine beyond ordinary and reasonable wear; and, second, to provide a cutting attachment in which the knife is adapted to trim and evenly finish edges of any kind of stock, whether firm or spongy, and of any outline, whether curved, straight, or tortuous, without interruption of the operation; to cut and trim holes isolated from the edge of the stock without cutting through said edge; to be adjusted so as to have the wear of its cutting-edge compensated for, and to operate to good advantage without being necessarily frequently sharpened.

To these ends my invention consists, first, in a knife adapted to reciprocate lengthwise or against the edge of the stock as the latter is held on the machine, and thus trim the same substantially parallel with the direction in which it is moved by the feed of the machine, instead of crosswise or against the side of the stock, as heretofore.

The invention also consists in a knife adapted to reciprocate lengthwise or against the edge of the stock, combined with two shoulders or metal edges, between which the stock is clamped and held at the point where it is acted on by the knife, the latter reciprocating in a path that is close beside or against said metal edges, and cuts the material in a line parallel with the stitches.

The invention also consists in the construction and form of the knife, the form of the presser-foot, the mechanical means for operating or driving the knife, the provision of means for adjusting the knife so as to compensate for the wear of its cutting-edge, and certain combinations of parts, all of which I will now proceed to describe, and point out in my claims.

In the drawings, A represents the bed of a sewing-machine. C represents the knife or trimmer, which, in the present instance, is at the end of a shank or lever, C′, this shank resting horizontally on the bed of the machine, and being pivoted thereto at *b*. The knife C is preferably formed by turning up one end of the shank C′ substantially at right angles with the body of the shank, notching one edge of this turned-up portion, and sharpening the inclined edges forming the notch. The shank C is adapted to be oscillated on its pivot by connections with the driving-shaft of the machine, to be hereinafter described, and thus oscillate or reciprocate the knife C, so as to cut the edges of the material in a line parallel with the direction of the line of stitching of the machine—that is to say, the direction in which the stock is moved by the feed.

J represents the presser-foot of the machine, which is so formed on its lower side as to have a limited bearing on the stock over the feed and opposite the knife, and is cut away, and has an orifice for the passage of the needle. The presser-foot is provided with a surface or tread, which bears upon the stock, and back of this surface it is curved upwardly and rounded on the bottom, for a purpose which will appear hereinafter.

Under the presser-foot is a projection, *p*, which is formed on the throat-plate B, and forms a raised bed or bearing for the stock under the presser-foot. The sides of the presser-foot J and projections *p*, which are adjacent to the knife, are flush with each other, and are substantially parallel with the path in which the feed moves, these sides forming clamping metal edges 1 2, between which the stock is held while being cut, the knife being so arranged that it works close to or against said edges during its entire movement.

When the knife makes a forward movement it cuts the stock, forming a cut edge parallel with the line of stitches being formed by the machine, the knife being preferably so adjusted as to move forward between the movements of the stock by the feed, so as not to obstruct the latter, and while the needle is depressed, the needle transfixing the stock and aiding the presser-foot in preventing the lateral displacement of the stock by the pressure of the knife.

It will be seen from the foregoing that the movement of the knife is lengthwise, or against the edge of the stock; hence the latter is enabled, by its position, to present the maximum of resistance to the thrust or pressure of the knife, and, therefore, is less liable to yield, and is cut to better advantage than would be the case if the knife reciprocated crosswise of the stock. Moreover, the knife, moving in a path to cut the edge of the material parallel with the stitches or lengthwise of the clamping-edges 1 2, cannot strike percussively against either of said edges, nor press the leather or stock against the lower or supporting edge and wear it away, as would a knife moving crosswise of said edges. The knife working close to or against the edges 1 2, cuts the stock along the line where it is supported and held, this line being flush with the edges 1 2. The knife is thus adapted to remove a very thin shaving from the edge of the stock, and leave the trimmed edge clean and smooth.

The shape of the knife C may vary for different kinds of work; for instance, it may be formed to cut rounded or other shaped edges by grooving, beveling, or otherwise forming the blade. One of these modifications is shown in Fig. 8, where the blade is grooved on one side so as to form a rounded edge, the movement of the knife enabling this form of edge to be used to good advantage, while in a rising and falling knife such an edge could not be used, as will be readily seen.

For general use I prefer to make the outer side of the knife (or the side adjacent to the metal edges) vertical, the cutting-edge notched or < shaped and the back inclined or rounded from the shank C′ to the upper end or point of the cutting-edge, both the back and edge terminating in this point, as shown in Figs. 5 and 6. The notched or < shaped cutting-edge is best adapted for trimming and evenly finishing all kinds of leather, particularly soft and spongy kinds, the stock being presented to the knife at the angle or apex of its notched cutting-edge, and compressed by the two inclines thereof, which, in moving against the stock, exert an inward pressure from both sides toward the center of the stock, the latter being thus compressed or turned in at its corners or edges, and prevented from being burred at the trimmed edge. The rounded back of the knife facilitates the turning of the stock during the operation of trimming, the back of the knife acting as a cam and raising the part of the stock back of the needle when the stock is turned, while the rounded bottom of the presser-foot creates a space between the back of the knife and the presser-foot in which the stock may rise or move as it slides up the back of the knife. This construction enables me to trim a sharp angle or an abrupt curve of any form without stopping the machine or tearing the stock.

The outer side of the knife is substantially parallel with the line in which the knife moves, and the opposite or inner side is beveled or inclined from the back to the cutting-edge, and therefore is diagonal to the line in which the knife moves, the two sides meeting at the cutting-edge and giving the knife a wedge-shape in horizontal section. When the knife moves through the leather in cutting, a longitudinal pressure is exerted by the leather against the beveled inner side of the knife, and this pressure causes the knife to hug or bear automatically against the metal edges 1 2. The rubbing contact of the outer side of the knife against the metal edges tends to keep the cutting-edge sharp, any burr or wire edge that may be formed thereon being removed by said rubbing contact, said burr or wire edge being invariably turned toward the metal edges 1 2, as I have found by experience.

When cutting stock which is firm and stiff in texture an ordinary roll-presser may be employed, thus doing away with the upper metal edge. The construction of a roll-presser is such as to necessitate its bearing on the stock at one side of the needle only—*i. e.*, the side opposite the knife—the position of the stock with relation to the path of the knife enabling the latter to cut firm stock without the co-operation of the edge of the presser-foot, in the manner heretofore described.

Power is communicated to the shank C′ and knife C, in the present case, by the following elements, viz: A face cam, H, on the horizontal shaft I of the sewing-machine, a lever, G, pivoted to a hanger, F, on the under side of the bed A, and provided with a stud and friction-roll, *i*, which engages with the groove of the face-cam, a slide, D, which is jointed to the upper end of the lever G, and is provided with an orifice to receive a pin, *d*, which is attached to the shank C′, and projects downwardly through a slot in the bed A, the slide being supported by a horn or rest, *e*. These parts are operated by the rotation of the shaft I in such manner as to oscillate the shank C′ and its knife C in a short arc of a circle, but the arc is so short in comparison to its radius that the movement of the knife practically produces the same effect as one whose movement is rectilinear.

As the cutting-edge of the knife becomes worn away by use, it is necessary to move it forward to compensate for the wear. For this purpose I move the hanger F forward, (the latter being attached to the bed A by a set-screw, *f*, passing through a slot, *f′*, in the hanger,) thus adjusting the lever G, slide D, pin *d*, and shank C′, so as to bring the knife C forward toward the operator.

My invention is applicable to the machine represented, with but little alteration thereof, the ordinary screw-hole *a* of the throat-plate B serving to receive the fulcrum *b* of the shank C′, while the gage-hole, somewhat elongated, serves to receive the pin *d* that connects the shank to the driving mechanism.

The construction and operation of the knife and shank is such as to present no obstruction under the arm of the machine to the work, which is consequently enabled to be turned freely.

My invention is applicable to so-called wax-thread machines, or where a hook or barb needle and awl are used, as well as to other sewing-machines, it being applied, in like manner, to be operated by a lever or shaft, and the knife brought near to work in the side curve of the presser-foot, as ordinarily formed for the usual siding or stitching gage. In this case the knife, oscillating laterally and in a plane parallel with the work, does not interfere with the thread-guide; or the knife may be hung so as to be oscillated laterally from the arm of a sewing-machine, or otherwise arranged on a sewing-machine as preferred, to oscillate or reciprocate laterally on the machine, substantially parallel with the direction of the feed of the machine.

A modification of my invention is shown in Figs. 11, 12, and 13, in which the knife is provided with a short shank, which is rigidly attached to a slide, K′, which may be an ordinary shuttle-cover. This slide is adapted to move in a plane absolutely parallel with the direction of the feed of the machine, and is operated by a lever, M, which is pivoted to the under side of the bed A, and is connected with an arm or slide, D′, which extends through an aperture, *l*, ordinarily formed in the rim or flange A′ of the bed, and is jointed to the lever G, the latter being arranged as before described, and oscillated by the face-cam H, the knife being caused to reciprocate in a direct line, instead of a short arc of a circle, as when the shank C′ is oscillated on a pivot. In either case the result is the same, it being immaterial whether the knife moves in a straight line and in a plane, which is absolutely parallel with the direction of the feed, as in the modification last described, or in a short arc of a circle.

I claim as my invention—

1. In combination with the stitch-forming mechanism of a sewing-machine, a reciprocating knife, arranged to cut against the edge of the stock parallel to the line of stitching, as set forth.

2. In combination with the stitch-forming mechanism of a sewing-machine, a reciprocating knife, arranged to cut against the edge of the stock parallel to the line of stitching, and two metal edges, 1 2, which hold and support the stock along or close beside the line on which the knife moves, said edges being flush and substantially parallel with the path of the knife, substantially as set forth.

3. The knife C, having its outer side substantially parallel with the line of its movement, and its inner side in a plane, that is diagonal to the plane of the outer side, and mechanism for reciprocating the same, combined with the metal edges 1 2, which are substantially parallel with the path of the knife, substantially as and for the purpose set forth.

4. The knife or trimmer C, having the notched or <-shaped cutting-edge, and the rounded or inclined back, said back and edge terminating at one point, as set forth.

5. The knife or trimmer C, constructed as described, and carried at the end of the horizontal shank or lever C′, as set forth.

6. A sewing-machine knife or trimmer at the end of a horizontal plate or shank, inclined or curved upwardly from the back toward the operator, and rounded on the top edge to near the front, where it is sharpened to a point, and having its front notched in and sharpened, and its sides shaped to trim any desired form of edge on the work, substantially as and for the purposes specified.

7. A presser-foot having its rear portion bent or curved up and rounded on the bottom, in combination with a throat-plate cut down to form an edge, 2, and a notched knife or trimmer, C, substantially as described.

8. The combination, with the stitch-forming mechanism of a sewing-machine, of a knife projecting above the top of the base, and mechanism for reciprocating the same against the edges of the stock, to cut the edge of the material parallel to the line of stitches, as set forth.

9. The knife C and shank C′, combined with the pin *d* and slide D, adapted to be reciprocated horizontally by the power of the machine, as set forth.

10. The laterally-adjustable hanger F′, combined with the lever G, slide D, pin *d*, and shank C′, having the knife C, as set forth.

LYMAN L. BARBER.

Witnesses:
C. F. BROWN,
S. C. MAINE.